(12) United States Patent
Koshy et al.

(10) Patent No.: US 11,409,881 B2
(45) Date of Patent: Aug. 9, 2022

(54) METHOD AND APPARATUS FOR WIRELESS SIGNAL BASED LOCATION SECURITY SYSTEM

(71) Applicant: Dell Products, LP, Round Rock, TX (US)

(72) Inventors: Kamal J. Koshy, Austin, TX (US); Eugene R. Simpson, New Taipei (TW); Lars Fredrik Proejts, Taipei (TW)

(73) Assignee: Dell Products, LP, Round Rock, TX (US)

(*) Notice: Subject to any disclaimer, the term of this patent is extended or adjusted under 35 U.S.C. 154(b) by 350 days.

(21) Appl. No.: 16/538,793

(22) Filed: Aug. 12, 2019

(65) Prior Publication Data

US 2021/0049280 A1    Feb. 18, 2021

(51) Int. Cl.
| | |
|---|---|
| *G06F 21/57* | (2013.01) |
| *H04W 12/00* | (2021.01) |
| *G06F 9/4401* | (2018.01) |
| *G06F 21/62* | (2013.01) |
| *H04W 12/08* | (2021.01) |

(52) U.S. Cl.
CPC ............ *G06F 21/575* (2013.01); *G06F 9/442* (2013.01); *H04W 12/009* (2019.01); *G06F 2221/034* (2013.01)

(58) Field of Classification Search
CPC .. G06F 21/575; G06F 9/442; G06F 2221/034; G06F 2221/2111; G06F 21/6218; G06F 9/4401; H04W 12/009; H04W 4/021; H04W 12/08

USPC ................................................. 713/1, 2, 100
See application file for complete search history.

(56) References Cited

U.S. PATENT DOCUMENTS

| | | | |
|---|---|---|---|
| 7,281,131 B1 * | 10/2007 | Reuter | H04L 63/104 |
| | | | 713/164 |
| 8,838,376 B2 | 9/2014 | Garin | |
| 8,847,754 B2 | 9/2014 | Buchheim | |
| 8,874,129 B2 | 10/2014 | Foruntanpour | |
| 9,168,656 B1 | 10/2015 | Wang | |
| 9,204,257 B1 | 12/2015 | Mendelson | |
| 9,674,658 B2 | 6/2017 | Partheesh | |
| 9,677,890 B2 | 6/2017 | Yang | |
| 9,802,322 B2 | 10/2017 | Angle | |
| 10,140,769 B2 | 11/2018 | Kim | |
| 10,257,715 B2 | 4/2019 | Egner | |
| 10,278,154 B2 | 4/2019 | Ronen | |

(Continued)

*Primary Examiner* — Michael J Brown
(74) *Attorney, Agent, or Firm* — Prol Intellectual Property Law, PLLC; H. Kenneth Prol

(57) ABSTRACT

A method of controlling access of an information handling system to a secured network may comprise detecting a time of flight (TOF) signal distance between the information handling system and a plurality of WLAN access points and received signal strength indication (RSSI) values to determine, via a processor executing code instructions of the information handling system, a location fingerprint of the information handling system relative to the plurality of address-identified wireless local area network (WLAN) access points and a secured perimeter of the facility before completing a boot process of the information handling system or allowing access to a secured network, if the location fingerprint indicates the information handling system is located within the secured perimeter.

20 Claims, 7 Drawing Sheets

(56) References Cited

U.S. PATENT DOCUMENTS

| | | |
|---|---|---|
| 2010/0250759 A1* | 9/2010 | Cox .................... H04L 63/1441 709/229 |
| 2011/0305337 A1 | 12/2011 | Devol |
| 2013/0031598 A1* | 1/2013 | Whelan ................ H04L 63/083 726/1 |
| 2015/0031390 A1 | 1/2015 | Robertson |
| 2015/0289094 A1 | 10/2015 | Jang |
| 2016/0282862 A1 | 9/2016 | Duffley |
| 2018/0152848 A1 | 5/2018 | Egner |
| 2018/0160441 A1 | 6/2018 | Egner |
| 2018/0367314 A1 | 12/2018 | Egner |

* cited by examiner

METHOD AND APPARATUS FOR WIRELESS SIGNAL BASED LOCATION SECURITY SYSTEM

CROSS REFERENCE TO RELATED APPLICATIONS

Related subject matter is contained in the following co-pending applications:

U.S. application Ser. No. 16/530,978, filed Aug. 2, 2019, entitled "SYSTEMS AND METHODS OF ROOM PROFILING USING WIRELESS LOCAL AREA NETWORKS," invented by Dileep Kumar Soma et al., and assigned to the assignee hereof.

U.S. application Ser. No. 16/538,769, filed Aug. 12, 2019, entitled "METHOD AND APPARATUS FOR LOCATION AWARE OPTIMAL WIRELESS LINK SELECTION SYSTEM," invented by Kamal J. Koshy et al., and assigned to the assignee hereof.

FIELD OF THE DISCLOSURE

The present disclosure generally relates to security of data accessed by mobile information handling systems, and more specifically to inhibiting unauthorized access to remote computing capabilities via geofencing security measures.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, communications with the information handling system may occur wirelessly via access to access points or base stations located within range of a network interface of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
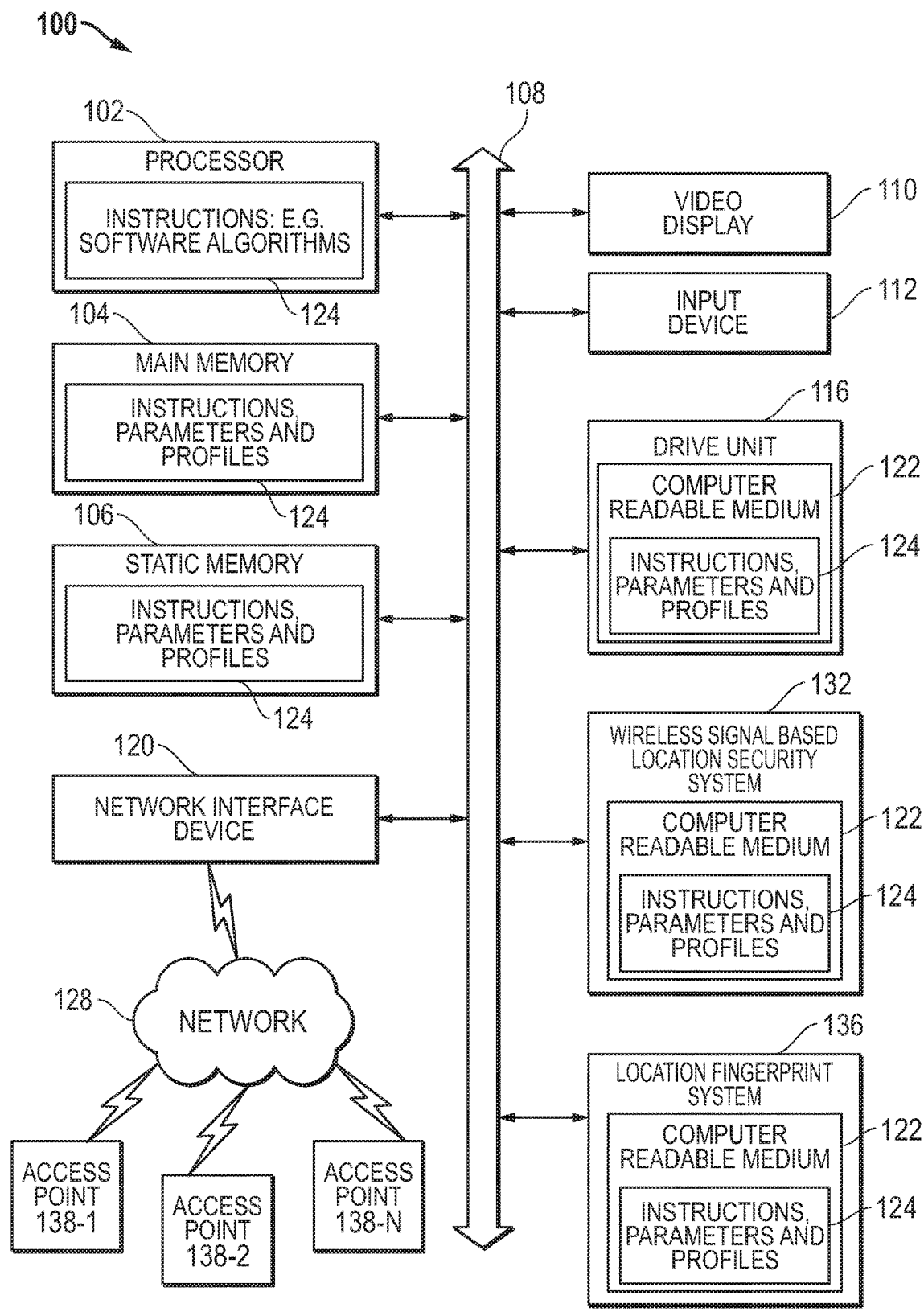
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on stationary information handling systems are now being completed on mobile devices. However, there is a competing need to keep mobile devices secure. A secure network may include one or more wireless access points (APs) in communication with one or more mobile devices. Such a network may be secured by a plurality of methods or security layers. For example, a first security layer may include the Wi-Fi Protected Setup (WPS) security layer, in which the network APs only grant network access to mobile devices providing a protected password or other identification. A second layer may include geofencing methods, in which mobile devices may access secure networks or secure systems on the mobile device itself only upon verification of the mobile device's location within a preset, secure area. Such verification of geographic location may be achieved through various means in existing systems, including through Global Positioning Satellite (GPS) data, and identification with near-field communication (NFC). GPS data works best in outdoor environments with exceptional line-of-sight, and is ill-suited for use indoors. Further, NFC methods require extensive installation and maintenance and incorporation of extra components within a mobile information handling system to allow it to perform near-field communications with one or more closely geographically situated access points. A solution is needed for indoor geofencing that decreases maintenance and installation requirements, is not easily circumvented, and does not require extra components.

Embodiments of the present disclosure address these issues by triangulation of a mobile information handling system in a manner that is not easily circumvented, or spoofed, based on known access points, gateways, or routers with which the mobile device is in communication. Such a method in embodiments described herein may include determining a location fingerprint of an information handling system relative to a plurality of address-identified access points (APs). Location fingerprints in an embodiment may describe relative distances between a mobile information handling system and one or more known AP locations, as well signal quality parameters for each wireless link between the mobile information handling system and each of the known APs. The signal quality parameters in an embodiment may be described based on RSSI values, for example. RSSI values for a given wireless link may vary based on the number and consistency of physical boundaries (e.g., floors, ceilings, walls, doors, furniture, people) through which the signal must pass between the mobile information handling system and a given AP. As such, the location fingerprint in embodiments described herein may define the relative location of the mobile information handling system with respect to the one or more known APs, and the surrounding architectural layout of the secured perimeter and barriers such as walls within which the mobile information handling system is meant to operate. The location fingerprint in such embodiments may be very difficult to "spoof" because doing so would require intimate knowledge of the architectural layout of the area within the secured perimeter and access to the secured, address identified APs.

A wireless signal based location security system operating at the mobile information handling system or the one or more APs in embodiments described herein may provide secure access to sensitive networks and operating systems based on the above-described location fingerprints. For example, the wireless signal based location security system operating at the mobile information handling system in embodiments may grant access to secure networks or may only complete boot up (giving the user access to the operating system of the mobile information handling system) upon determination the location fingerprint for the mobile information handling system places it within a known, preset, security perimeter relative to known and secured MAC-addressed APs. As another aspect of embodiments described herein, the wireless signal based locations security system operating at the mobile information handling system or the AP may deny access to secure networks unless the mobile information handling system is being operated by an authorized user, within the secured area, the security perimeter is fully secured, and no other non-secure information handling systems are located nearby. In yet another aspect of embodiments described herein, the wireless signal based location security system may withdraw access to a secure network or perform a remote shut down of a mobile information handling system if a breach of the security perimeter occurs, a lower-level security device enters the secured area, or the authorized user of the mobile information handling system moves away from the mobile information handling system. Determinations underlying the methods of each of these embodiments may be made based on the location fingerprint described herein, which may not require the use of GPS methods, or NFC methods, and may be highly difficult to circumvent. In such a way, embodiments of the present disclosure may provide a security method, based on indoor geofencing, that decreases maintenance and installation requirements, and does not require extra components.

FIG. 1 illustrates an information handling system 100 similar to information handling systems according to several aspects of the present disclosure. In embodiments presented herein, the information handling system 100 may include the information handling system 100 forming part of a wireless network and communicatively coupled to a plurality of access points 138-1, 138-2, 138-N. In an embodiment, the information handling system 100 may be any computing device that interacts with the access points 138-1, 138-2, 138-N so as to communicate with the access points 138-1, 138-2, 138-N and/or other devices communicatively coupled to the information handling system 100 shown in FIG. 1.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. Although the present disclosure may refer to the use of a plurality of access points (i.e., wireless access point (WAP)) and at least one information handling system as being an interaction between a Wi-Fi device and a computing device, respectively, the present specification contemplates that other devices may be used in the present system as described herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Elements within the information handling system 100 can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. Elements of the information handling system 100 can also include one or more buses operable to transmit communications between the various hardware components. Portions of an information handling system 100 may themselves be considered information handling systems 100.

Elements of the information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, access points, client devices, data points, or on-box in individual client information handling systems according to various embodiments herein. In some embodiments, it is understood any or all portions of code instructions 124 may operate on a plurality of information handling systems 100.

Elements of the information handling system 100 may include a processor 102 such as a central processing unit (CPU), control logic or some combination of the same. Any of the processing resources may operate to execute code that is either firmware or software code. Moreover, elements of the information handling system 100 can include memory such as main memory 104, static memory 106, computer readable medium 122 storing instructions 124 of the wireless signal based location security system 132, the location fingerprint system 136, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

Elements, such as the information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard. The information handling system 100 can also include a disk drive unit 116.

The network interface device 120 shown as a wireless adapter, can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless network interface device 120 may operate two or more wireless links.

Wireless network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

Elements of the information handling system 100 can include a set of instructions 124 that can be executed to cause the computer system to perform any one or more of the methods or computer-based functions disclosed herein. For example, instructions 124 may execute a wireless signal based location security system 132, or location fingerprint system 136, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, wireless signal based location security system 132, and the location fingerprint system 136 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. In an embodiment, the main memory device 104 or any other memory device may maintain certain data used to implement the processes and methods described herein. This data may include a TOF signal between the information handling system 100 and each of the access points 138-1, 138-2, 138-N; and/or a media access control (MAC) address associated with each of the access points 138-1, 138-2, 138-N.

The disk drive unit 116 and static memory 106 may also contain space for data storage. Further, the instructions 124 may embody one or more of the methods or logic as described herein. For example, instructions relating to the wireless signal based location security system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the wireless signal based location security system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The wireless signal based location security system 132, or location fingerprint system 136 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In an embodiment, the information handling system 100 may include the wireless signal based location security system 132 and the location fingerprint system 136 that may be operably connected to the bus 108. The wireless signal based location security system 132 computer readable medium 122 may also contain space for data storage. The wireless signal based location security system 132 may, according to the present description, perform tasks related to granting mobile information handling systems only within a secured perimeter access to a secured network via a plurality of access points 138-1, 138-2, 138-N. In an embodiment, the wireless signal based location security system 132 may be in the form of computer readable program code executable by the processor 102 that receives signal strength data from, for example, the network interface device 120 or other device associated with the information handling system 100. In an embodiment, the wireless signal based location security system 132 may be in the form of an application specific integrated circuit (ASIC) that receives signal strength data from the network interface device 120.

In an embodiment, the wireless signal based location security system 132 and location fingerprint system 136 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In an embodiment, the information handling system 100 may include a location fingerprint system 136 that may be operably connected to the bus 108. The location fingerprint system 136 computer readable medium 122 may also contain space for data storage. The location fingerprint system 136 may, according to the present description, perform tasks related to measuring the time interval taken by a signal through a medium. In a specific embodiment, the location fingerprint system 136 may measure the duration of time a signal is sent to or received by one or more access points 138-1, 138-2, 138-N and a response signal is received by or sent by (respectively) an information handling system 100. In this embodiment, the time of flight data may include timestamp data from the access points 138-1, 138-2, 138-N that indicates when the access points 138-1, 138-2, 138-N sent the signal thereby indicating the time of flight value. Alternative embodiments include a series of signals passed between the information handling system 100 and any individual access point 138-1, 138-2, 138-N so as to determine an average time of flight value over the series of sent signals. Again, the signal sent to and from the access points 138-1, 138-2, 138-N and/or information handling system 100 may include a time stamp indicating the time the signal was sent. In an embodiment, the location fingerprint system 136 may measure the TOF using the 802.11mc protocol which is the Wi-Fi® Round-trip-Time (Wi-Fi RTT) protocol used to measure the distance to nearby Wi-Fi® access points 138-1, 138-2, 138-N and used to determine an location of the information handling system 100 within 1-2 meters.

The location fingerprint system 136 may also, according to the present description, perform tasks related to measuring a power present in a received wireless signal such as a signal received by the information handling system 100 from a plurality of access points 138-1, 138-2, 138-N. In an embodiment, the location fingerprint system 136 may be in the form of computer readable program code executable by the processor 102 that receives signal strength data (e.g., received signal strength indicator (RSSI)) from, for example, the network interface device 120 or other device associated with the information handling system 100. In an embodiment, the location fingerprint system 136 may be in the form of an application specific integrated circuit (ASIC) that receives signal strength data from the network interface device 120. During operation of the information handling system 100, a drop in measured power in the received wireless signal by the network interface device 120 and analyzed by the location fingerprint system 136 may indicate a physical barrier being placed between the information handling system 100 and any of the access points 138-1, 138-2, 138-N. In some examples, this allows the data received by the information handling system 100 by the plurality of in-range access points 138-1, 138-2, 138-N to be used to define metes and bounds of an area such as a room the information handling system 100 is present within relative to the plurality of address-identified access points. Address-identification for the access points 138-1, 138-2, 138-N may be MAC addresses for example. This may also increase the knowledge of the physical layout of a plurality of rooms defined within an architectural plan of a building the information handling system 100 is present within.

In an embodiment, the location fingerprint system 136 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. This communication allows for the location fingerprint system 136 to receive the data related to the signal strength of a received signal from an access point 138-1, 138-2, 138-N and provide data representative of any decrease in signal strength over some period of time (i.e., over nanoseconds).

The location fingerprint system 136 may compare the RSSI data to the time of flight (TOF) data to detect a reduction in power of the signal strength (resulting from the signal passing through a structure) relative to the time the signal took to be received by either or both of the information handling system 100 or network interface device 120. The reduction in RSSI relative to the TOF data may indicate an barrier or object such as a wall is present between any of the access points 138-1, 138-2, 138-N and any information handling system 100 within the network operating the systems and methods described herein.

During operation of the information handling system 100, the barrier through which the signal is passed may be any type of object that is one of a permanently fixed object in a room (i.e., wall, ceiling, floor, door, etc.) or an object that is temporarily placed between the information handling system 100 and any of the access points 138-1, 138-2, 138-N (i.e., a chair, an open or closed door, a person, furniture, etc.). In an example, the location fingerprint system 136 may receive the signal strength data from the network interface device 120 and determine, based on any reduction in power of the signal, the relative thickness of the object placed between the information handling system 100 and any of the access points 138-1, 138-2, 138-N. Thus, in this embodiment, the reduction in the signal strength may be proportional to the distance the signal is passed through any given object. In an embodiment, the location fingerprint system 136 may compare the RSSI to the TOF signal received from any of the access points 138-1, 138-2, 138-N at the information handling system in order to determine whether a reduction in power of the RSSI exceeds a threshold reduction value. This threshold reduction value may be set to any sensitivity level that represents a reduction in power of the RSSI the location fingerprint system 136 is capable of detecting. In an embodiment, the location fingerprint system 136 may set the threshold reduction value between 6 and 10 decibels (dB). As described herein, the location fingerprint system 136 may detect the RSSI and compare the RSSI value to the TOF value at any time and any number of times over a given period of time. Thus, this comparison may be conducted iteratively for any number of times based on instructions provided by, for example, a network administrator providing settings indicating when and how often to conduct the comparison. In a specific example, a motion sensor within the information handling system 100 may detect motion of the information handling system 100 and initiate the methods described herein to detect the RSSI and TOF values in order to create a new location fingerprint related to the position of the information handling system 100 within a room relative to any of the access points 138-1, 138-2, 138-N communicatively coupled to the wireless network and wirelessly detectable by the information handling system 100. In this way, boundaries such as walls and doors can be determined for a layout of a secured space without the need for GPS. Similarly, one or more security perimeters may be determined relative to the secured, address identified APs within a secured facility.

Further, in an embodiment, the location fingerprint system 136 may continually receive signal strength data from any of the access points 138-1, 138-2, 138-N and determine, based on historic signal strength data (i.e., data maintained on the computer readable medium 122), whether that object is a permanent object or whether the object is a temporary object. In the embodiment where the object placed between the information handling system 100 and any of the given access points 138-1, 138-2, 138-N is a permanent object, the location fingerprint system 136 may indicate to the processor 102 that that the object is consistently contributing to a reduction in power over a threshold number of sets of signal strength data. This threshold number of sets of signal strength data may be set by a network or system administrator and may be based on the number of times the location fingerprint system 136 causes a signal to be sent from and/or received by the location fingerprint system 136 over a given period of time from that fingerprint location. In the embodiment where the object placed between the information handling system 100 and any of the access points 138-1, 138-2, 138-N is a temporary object the location fingerprint system 136 may indicate to the processor 102 that that object not normally there. The location fingerprint system 136 may then determine whether the object will contribute to a reduction in power of the signal strength over a threshold number of sets of signal strength data.

The location fingerprint system 136 in an embodiment may also receive all RSSI and TOF data from related to all of the access points 138-1, 138-2, 138-N and/or other information handling systems 100 present within the network. In another embodiment, the location fingerprint system 136 may receive all RSSI and TOF data accrued between the specific information handling system 100 and all access points 138-1, 138-2, 138-N the information handling system 100 has communicated with within the wireless network. The location fingerprint system 136 may use an unsupervised clustering process to create determined location data associated with the networked devices (i.e., access points 138-1, 138-2, 138-N and information handling system 100) having associated media access control (MAC) address or other identification information to determine the metes and bounds of the architectural layout of a building by defining walls and rooms of the building (i.e., defining physical boundaries around the information handling systems and/or access points). In an embodiment, this may be accomplished by first triangulating the locations of the information handling systems 100 relative to the access points 138-1, 138-2, 138-N associated with the MAC address. In a specific embodiment, the triangulation process may be accomplished through determining relative distances between an information handling system 100 and a plurality of access points 138-1, 138-2, 138-N creating a location fingerprint with respect to the MAC address associated with any access points 138-1, 138-2, 138-N or any other data identifying the access points 138-1, 138-2, 138-N. Distances may be determined through the use of the TOF data received by the information handling system 100 and, specifically, the network interface device 120. Because the signals are propagated at the speed of light, this constant value may be used on connection with a time stamp to determine the distance between the information handling system 100 and the plurality of the access points 138-1, 138-2, 138-N.

In an embodiment, the information handling system may detect the presence of a plurality of access points 138-1, 138-2, 138-N and identify those access points 138-1, 138-2, 138-N by their respective MAC addresses. In this embodiment, any given access point 138-1, 138-2, 138-N may have a respective TOF value and corresponding RSSI value associated with it. Because these TOF and RSSI values are unlikely to be repeated among the access point 138-1, 138-2, 138-N and information handling system 100 pairs, these unique set of TOF and RSSI values relative to the access points 138-1, 138-2, 138-N MAC addresses may be used as an address-identified fingerprint assigned by the information handling system 100 to each of the access points 138-1, 138-2, 138-N. Consequently, the TOF and RSSI values described herein may be used by the information handling system 100 to determine the locations of the information handling system s100 relative to the access points 138-1, 138-2, 138-N without additional location data such as GPS or architectural-based location data.

In an embodiment, the information handling system 100 may also detect whether the physical location of any of the access points 138-1, 138-2, 138-N has been changed, whether any of the access points 138-1, 138-2, 138-N has been removed from the wireless network, and/or whether any additional or new access points 138-1, 138-2, 138-N have been communicatively coupled to the wireless network. This is because the RSSI and TOF values associated with any MAC address of any of the access points 138-1, 138-2, 138-N changes, is no longer detectable by the information handling system, or includes a new set of RSSI and TOF values not detected before (respectively). Thus, in this embodiment, any adjustment to the access points 138-1, 138-2, 138-N within the wireless network may be detected by the information handling system and accounted for when the information handling system 100 is developing the architectural layout of the building using the clustering process described herein.

When multiple distances are determined between the information handling system 100 and the plurality of access points 138-1, 138-2, 138-N, a location of the information handling system 100 may be determined. As such, a location fingerprint may be created that associates the MAC address of each access points 138-1, 138-2, 138-N with any RSSI/TOF data pairs. A corresponding location fingerprint may be created the information handling system 100 for each information handling system 100 and access point 138-1, 138-2, 138-N pair, thereby allowing the comparison module 136 of the information handling system 100 to compare the RSSI/TOF pairs from each access point 138-1, 138-2, 138-N and cluster the location fingerprints based on similarities or dissimilarities between the location fingerprints. Indeed, for each access point 138-1, 138-2, 138-N communicatively accessible by the information handling system 100, the information handling system may associate an identification (i.e., a MAC address) of that access point 138-1, 138-2, 138-N with RSSI and TOF data. The information handling system 100 may have a number of RSSI and TOF data sets associated with any given access point 138-1, 138-2, 138-N when the information handling system 100 is physically moved throughout the architectural layout of the building in which the wireless network is deployed.

In some embodiments, the information handling system 100 may be any type of computing device communicatively coupled, either via wire or wirelessly, to any number of devices within a network. In an example, the information handling system 100 is a computing device that includes a processor 102, a main memory device 104, static memory device 106, video display 110, input device 112, drive unit 116, wireless signal based location security system 132, and location fingerprint system 136. In an embodiment, the information handling system 100 shown in FIG. 1 may by one of many different and distinct information handling systems 100 communicatively coupled within the network to perform the processes and methods described herein.

In some embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 of the information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
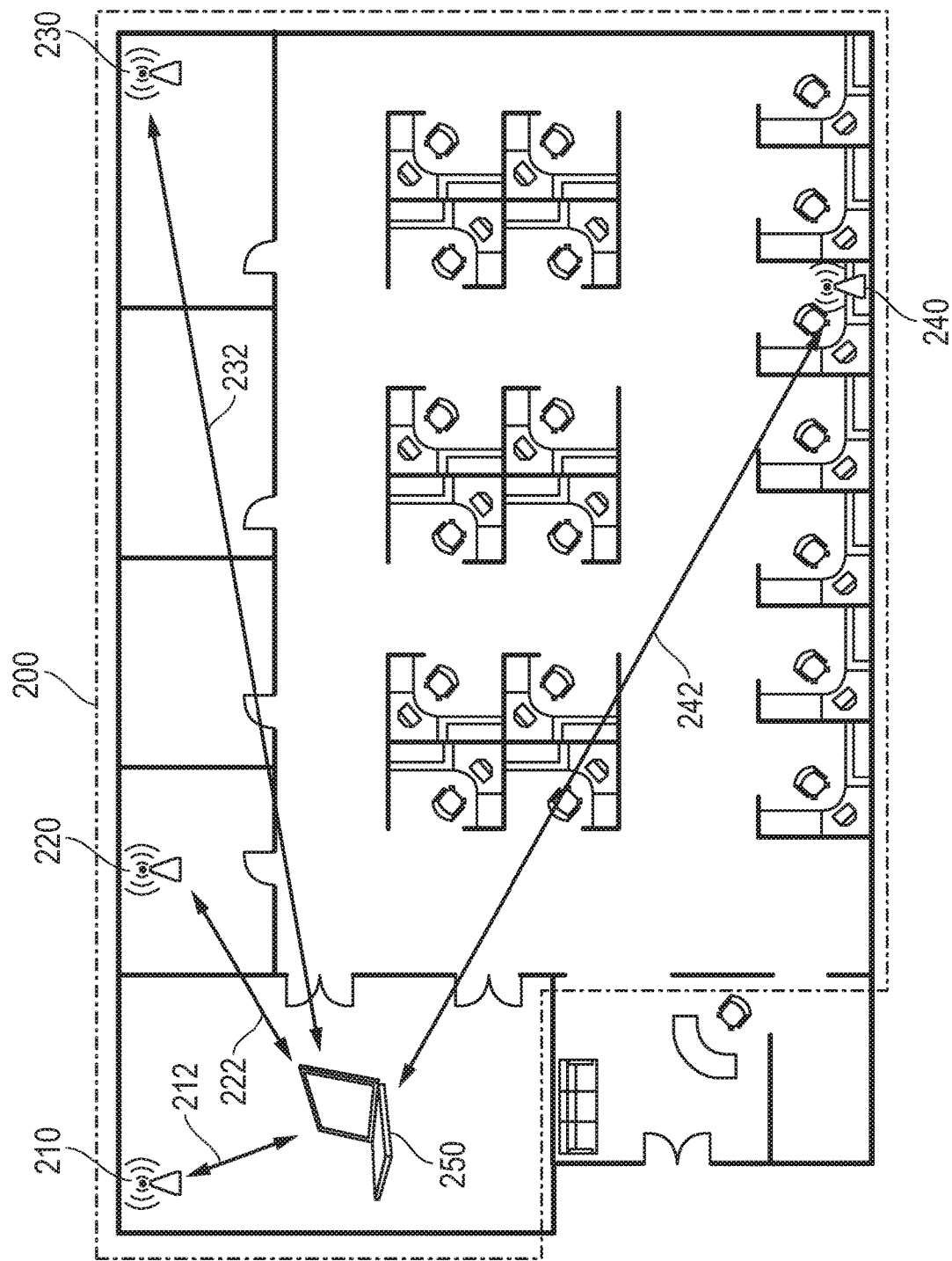
FIG. 2 is a graphic diagram illustrating a mobile information handling system having a location fingerprint within an indoor secured perimeter according to an embodiment of the present disclosure.

FIG. 2 is a graphic diagram illustrating a mobile information handling system having a location fingerprint within an indoor secured perimeter in communication with a plurality of secured APs within the secured perimeter according to an embodiment of the present disclosure. In the embodiment presented in FIG. 2, four access points 210, 220, 230, and 240 have been deployed inside a security perimeter 200. These access points 210, 220, 230, and 240 may be communicatively coupled to a network of devices such as each other as well as any number of information handling systems, including mobile information handling system 250 in an embodiment.

In an embodiment, the access points 210, 220, 230, and 240 may be a wireless access point (WAP) or other networking hardware devices that allow other Wi-Fi® or networked devices to connect to a secure, wired network. Thus, in an example, the access points 210, 220, 230, and 240 may be communicatively coupled to the network via a physical, wired connection such as an Ethernet® cable or via a wireless connection such as Wi-Fi® connection, a Bluetooth® connection, and a near-field communication (NFC) connection, among other types of wireless connections.

Access points 210, 220, 230, or 240 in an embodiment may be licensed or unlicensed, and may operate in any number of radio frequency bands. For example, both WLAN and WWAN may use the Unlicensed National Information Infrastructure (U-NII) band which typically operates in the ~5 MHz frequency band such as 802.11 a/h/j/n/ac/ad/ax (e.g., center frequencies between 5.170-5.785 GHz), and in the 60 GHz and 80 GHz bands such as 802.11ad. It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Each of the access points 210, 220, 230, or 240 in an embodiment may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards such as Bluetooth may be used. APs 210, 220, 230, or 240 in some embodiments may establish any combination of macro-cellular wireless connections including 2G, 2.5G, 3G, 4G, 5G or the like from one or more service providers such as Sprint, Verizon, AT&T, and T-Mobile. Service provider macro-cellular base stations may operate pursuant to 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like. Licensed carriers may include small cell base stations that operate in licensed communication frequency bands and may operate as an anchor wireless link in tandem with operation of unlicensed small cell WWAN wireless links of unlicensed small cell WWAN base stations as understood. For example, LTE-LAA or emerging 5G systems may operate with such an example embodiment architecture.

As another example, access points 210, 220, 230, or 240 may comprise unlicensed small cell WWAN base stations in an embodiment. An unlicensed small cell WWAN base station of such an embodiment may operate as a femtocell base station. In another example of such an embodiment, an unlicensed small cell WWAN base station may operate as an eNodeB base station. Example communication frequency bands may also include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless local network 200, the wireless access points 210, 220, 230, or 240 may operate under Wi-Fi or WiGig as well as small cell WWAN in emerging 5G technology in various embodiments. In several of the presently-described embodiments, Wi-Fi is described but it is understood that other protocols may be used with the embodiments herein.

In an embodiment, any/all of the access points 210, 220, 230, and 240 may transmit broadcast signals, which may be received at the mobile information handling system 250 or other information handling systems. Information within these received broadcast signals in an embodiment may be used to determine a relative distance of any single access point to a mobile information handling system. For example, these signals from each of the plurality of access points may include a time stamp indicative of when the signal was sent. In a specific embodiment, the Time of Flight (TOF) values sent to and/or received from each of the access points 210, 220, 230, and 240 may be used to triangulate a position of the mobile information handling system 250 or other information handling systems relative, at least, to each of the access points 210, 220, 230, and 240. This process may include comparing the timestamp of the signals from each of the plurality of access points (e.g., 210, 220, 230, 240) to the time the signal is received by the information handling system 250 from each of those points to calculate a time difference and associate the same with a MAC address of each of the in-range access points (e.g., 210, 220, 230, 240) and/or other information handling systems (not shown) coupled to the network and their respective identifiers. This process may continue with comparing the time differences calculated from each access point (e.g., 210, 220, 230, 240) and triangulating the position of the information handling system 250 relative to each of the access points (e.g., 210, 220, 230, and 240) accordingly. In embodiments, these values may also be indexed with RSSI values from each in-range AP. Although the present description provides a description of a specific process used to determine a location of any given access point relative to a plurality of access points or the information handling system, the present specification contemplates that other methods may be used. These other methods may include the receipt of data indicative of the position of the access points at the information handling system without relying on the information handling system to triangulate its location. Thus, in this embodiment, two or more of access points 210, 220, 230, or 240 may be used to triangulate the relative position of the mobile information handling system 250 with respect to the two or more access points 210, 220, 230, or 240.

Upon determining the position of the information handling systems 250 relative to a plurality of access points (e.g., 210, 220, 230, and 240), the systems and methods may detect an RSSI between the information handling systems 250 and a plurality of access points (e.g., 210, 220, 230, and 240). As described herein, when the access points (e.g., 210, 220, 230, and 240) are each within a "line-of-sight" of the information handling system 250, a power value associated with an RSSI may not decrease below a threshold indicating that there is no object between the access points (e.g., 210, 220, 230, and 240) and the information handling system 250. The term "line-of-sight" as used in the present description is meant to be understood as a path between an information handling system 250 and an access point (e.g., 210, 220, 230, and 240) with no object there between. Additionally, when the access points (e.g., 210, 220, 230, and 240) are located in a room separate from any information handling system 250, a physical barrier such as wall may disrupt the wireless signals sent between the information handling system 250 and access points (e.g., 210, 220, 230, and 240). Thus, the information handling system 250 may detect a reduction in power related to the RSSI from any access point (e.g., 210, 220, 230, or 240) or may be so notified by an access point (e.g., 210, 220, 230, or 240) that the RSSI has demonstrated a reduction in power. In either of these embodiments, a reduction in power of the RSSI may indicate that the wall physically separates, for example, an access point 220 and a mobile information handling system 250.

As described herein, location fingerprints in an embodiment may describe relative distances between a mobile information handling system and one or more address-identified APs, as well the determined RSSI values described directly above for each wireless link between the mobile information handling system and each of the address-identified APs. RSSI values for a given wireless link may vary based on the number and consistency of physical boundaries (e.g., floors, ceilings, walls, doors, furniture, people) through which the signal must pass between the mobile information handling system and a given AP. As such, the location fingerprint in embodiments described herein may define the relative location of the mobile information handling system with respect to the one or more secured, address-identified APs that deploy the wireless signal based location security system or location fingerprint system, and indirectly describe the surrounding architectural layout of the secured perimeter within which the mobile information handling system is meant to operate. Location fingerprints for a plurality of mobile information handling system locations determined over time may be stored at the one or more APs in an embodiment, or at a remote storage module accessible by one or more of the APs with which the mobile information handling system has established a wireless link. Stored location fingerprints in an embodiment may include previously measured RSSI and TOF values for information handling systems known to be located within the preset, secured perimeter. In some embodiments, the stored location fingerprints may be seeded by an information technology (IT) specialist to include RSSI/TOF/MAC address combinations measured by an information handling system as the IT specialist moves about an area the IT specialist wishes to define as secured.

Each access point in an embodiment may be capable of establishing a secured, wireless connection with one or more mobile information handling systems attempting to access a secure network to which each of the APs 210, 220, 230, or 240 connect. The mobile information handling system may initiate a series of Extensible Authentication Protocol (EAP) messages with the AP as part of a Wi-Fi Protected Setup (WPS) security method, in order to gain access to the secure network with which the AP. The AP in an embodiment may only grant access to mobile information handling systems that provide proper authorization, and have been previously determined to be located within the secured perimeter. For example, the mobile information handling system may transmit a password to the AP, taken from a sticker mounted on the external physical case of the AP. In another example, a user of the mobile information handling system may place the mobile information handling system and the AP in simultaneous discovery modes to identify one another by pressing a physical button on both the AP and the mobile information handling system contemporaneously. In yet another example, the mobile information handling system may establish a near-field communication link with the AP to identify itself as being located nearby the AP. In an embodiment, the mobile information handling system 250 may perform such a method to establish wireless link 212 with AP 210, wireless link 222 with AP 220, wireless link 232 with AP 230, or wireless link 242 with AP 240. Some or all of APs 210, 220, 230, or 240 may be in-range of information handling system 250. In some embodiments, the stored location fingerprints may include only location fingerprints associated with mobile information handling systems that have successfully initiated secured wireless communication links with one or more of the secure, address-identified APs through such an EAP handshake or other cryptographic security method. The location fingerprint in such embodiments may be very difficult to "spoof" because doing so would require access to the secured, address-identified APs in the area within the secured perimeter.

In an embodiment, one or more of APs 210, 220, 230, or 240 or mobile information handling system 250 may operate a portion of the wireless signal based location security system. For example, in an embodiment, APs 210, 220, 230, or 240 may control all access to a secured network, databases or storage systems set to operate only within the secured network, or other network resources, including portions of the operating system onboard information handling system 250 connecting to the secured network via one or more of APs 210, 220, 230, or 240. Thus, APs 210, 220, 230, or 240 running portions of the wireless signal based location security system may grant mobile devices access to these network resources.

In an embodiment, one or more mobile client information handling systems may operate some or all of the wireless signal based location security system as well. For example, a portion of the wireless signal based location security system operating on the mobile information handling system 250 may restrict the ability to complete the boot process for the mobile information handling system 250, or restrict an ability to wirelessly link to the secured APs 210, 220, 230, or 240, based on one or more security factors (e.g., location within the secured perimeter 200). Mobile information handling system 250 may operate the portion of the wireless signal based location security system in an embodiment via preboot authentication code instructions within the firmware, or within the Basic Input Output (BIOS) of the mobile information handling system 250 in various embodiments. The code instructions of the wireless signal based location security system in an embodiment may be executed entirely prior to handing off of processor functionality from the BIOS to the operating system of the mobile information handling system 250 in an embodiment. In another embodiment, an attempt to link to a secured AP 210, 220, 230, or 240 may trigger the wireless signal based location security system in BIOS. Although mobile information handling system 250 may operate a portion of the wireless signal based location security system in an embodiment, this portion functions only to interface with one or more of the APs 210, 220, 230, or 240 in communication with the secured network, such as for location fingerprint verification.

The location fingerprint determined for mobile information handling system 250 in an example embodiment may be compared against previously determined and stored location fingerprints for the mobile information handling system 250 or other information handling systems in order to determine whether the mobile information handling system 250 is located within the preset, secured perimeter 200. As described herein, previously determined location fingerprints may only be stored and identified as within the preset secured perimeter 200 upon determination that the mobile information handling system associated with that location fingerprint is indeed, within the secured perimeter 200. This may be achieved, for example, by only including location fingerprints seeded by an IT professional to define the perimeter 200, or by only including location fingerprints for information handling systems that have previously and successfully gained access to one or more of the secure, address-identified APs 210, 220, 230, or 240, although other methods are also contemplated. Further, the security perimeter 200 in such an embodiment may be drawn specifically to exclude a location fingerprint from a reception area through which visitors may enter the office. In such a way, an association between one or more stored location fingerprints and the boundaries of the security perimeter 200 may be known. Further, the wireless signal based location security system operating at the mobile information handling system 250 or at one or more of the APs 210, 220, 230, or 240 may identify the mobile information handling system 250 as inside or outside the secured perimeter 200 based on a comparison between the location fingerprint for the mobile information handling system 250 and previously stored location fingerprints known to be either within or outside the secured perimeter 200.

Figure 3:
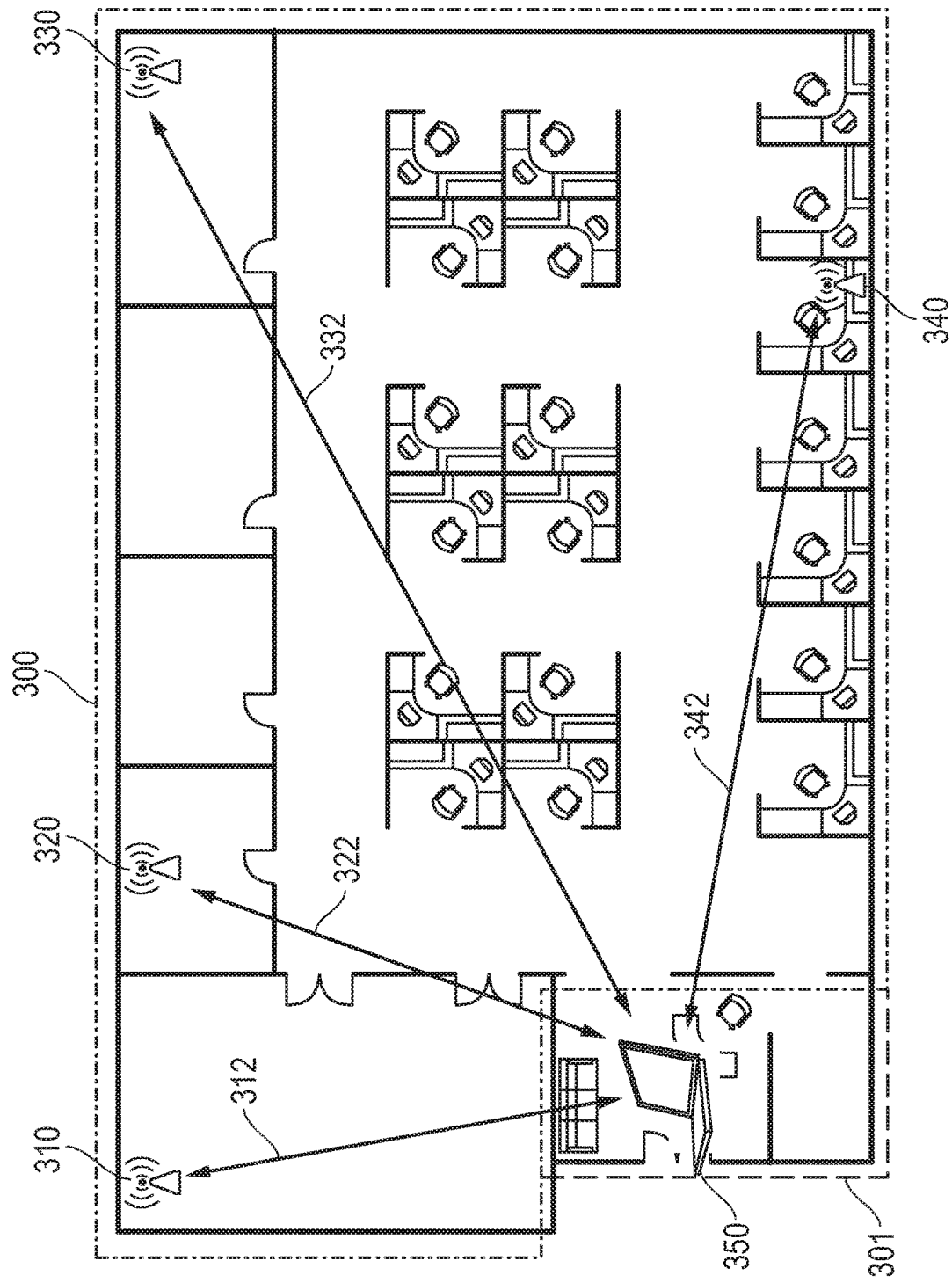
FIG. 3 is a graphic diagram illustrating a mobile information handling system having a location fingerprint outside an indoor secured perimeter according to an embodiment of the present disclosure.

FIG. 3 is a graphic diagram illustrating a mobile information handling system having a location fingerprint outside an indoor secured perimeter in communication with a plurality of secured APs within the secured perimeter according to an embodiment of the present disclosure. As described herein, the relative locations of each of the APs 310, 320, 330, and 340 (corresponding to APs 210, 220, 230, and 240 described with reference to FIG. 2) with respect to one another, and with respect to the boundaries of a secured perimeter 300 (corresponding to secured perimeter 200 in FIG. 2) in an embodiment may be known, based on an architectural layout determined according to embodiments herein and stored at one or more of the APs 310, 320, 330, or 340 or within the secure network with which each of the APs 310, 320, 330, and 340 are in communication. In an embodiment, a second secured perimeter 301 may be determined. Second perimeter 301 may have different hook-up permissions or access permissions among different managed information handling systems 350 or even modified operational permission for a single information handling system 350.

A location fingerprint, including such an architectural layout and a triangulated position in an embodiment may be used to determine the location of an information handling system 350 with respect to the secured perimeter 300 or 301, one or more structures identified within the architectural layout, or one or more of the APs 310, 320, 330, or 340. The mobile information handling system 350 may establish a wireless link 312 with AP 310, and a wireless link 332 with AP 330, in an example. The TOF for wireless links 312 and 332 in such an example embodiment may be compared with one another and with secured, address-identified APs 310 and 330 within the architectural layout to determine a location of the mobile information handling system 350 with respect to the secured perimeter 300, or one or more structures identified within the architectural layout. In another example embodiment, the mobile information handling system 350 may establish a wireless link 322 with AP 320, and a wireless link 342 with AP 340. The TOF for wireless links 322 and 342 in such an example embodiment may be compared with one another and with secured, address-identified APs 320 and 340 within the architectural layout to determine a location of the mobile information handling system 350 with respect to one or both of the secured perimeters 300 or 301, or one or more structures identified within the architectural layout. For example, it may be determined, using such methods, that the mobile information handling system 350 is located in the reception area, outside the secured perimeter 300, but within secured perimeter 301. In other embodiments, mobile information handling system 350 may be determined to be outside both perimeters. The examples described here are meant for illustrative purposes, and TOF flight based triangulation in other embodiments may be based on other combinations of wireless links, or on a greater number of wireless links.

Further, floors may be detected such that different secured perimeters 300 and 301 may be determined to be on different floors of a building. A floor/ceiling barrier may be determined according to direction of cluster location fingerprints and differences of TOF/RSSI values relative to secured, address identified APs on or both floors.

Figure 4:
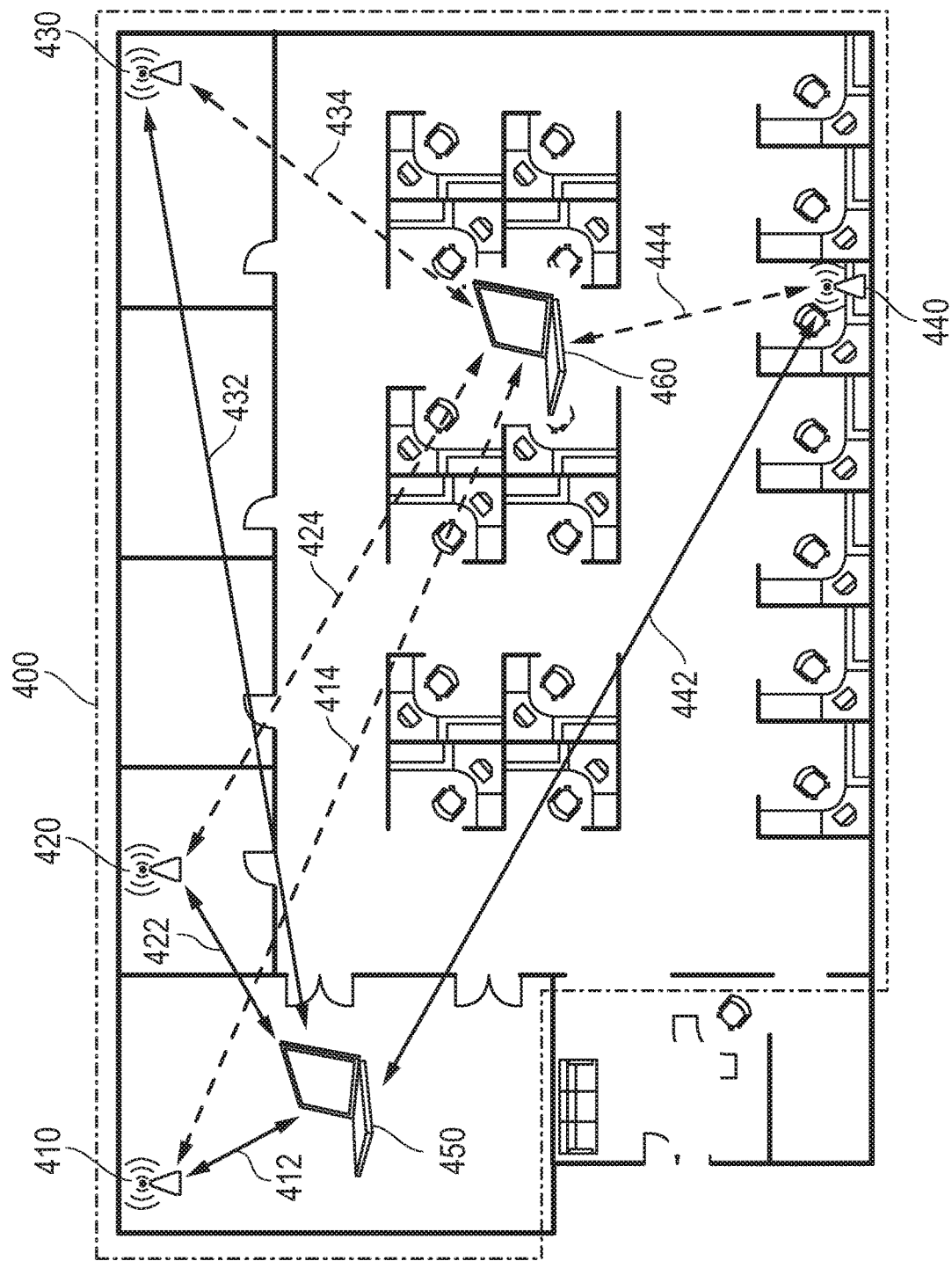
FIG. 4 is a graphic diagram illustrating a plurality of mobile information handling systems located within an indoor secured perimeter according to an embodiment of the present disclosure.

FIG. 4 is a graphic diagram illustrating a plurality of mobile information handling systems 450 and 460 located within an indoor secured perimeter 400 in communication with a plurality of secured access points list according to an embodiment of the present disclosure. As described herein, the wireless signal based locations security system operating at the mobile information handling system or the AP may deny a mobile information handling system access to secure networks or begin a remote forced shut down if the security perimeter is not fully secured, or if other non-secure information handling systems are located nearby. The wireless signal based location security system operating at one or more APs 410, 420, 430, or 440, the mobile information handling systems 450 or 460, or the network to which the APs 410, 420, 430, or 440 may connect, may determine one of these conditions has occurred in an embodiment based on the location fingerprints for one or more of information handling systems 450 or 460.

Multiple mobile information handling systems operating within an office in an embodiment may have differing levels of security clearance. For example, mobile information handling system 450 may have a highest available security clearance, sufficient to gain access to sensitive information within a secured network with which APs 410, 420, 430, and 440 are in communication. In contrast, mobile information handling system 460 may have a lower available security clearance, insufficient to gain access to sensitive information within the secured network, or even insufficient to access the secured network at all. Further, the lower available security clearance of mobile information handling system 260 in such an embodiment may be insufficient to grant access to sensitive information stored on mobile information handling system 250 and accessible by the operating system of mobile information handling system 250.

The wireless signal based location security system in an embodiment may determine the location fingerprints for the mobile information handling systems 450 and 460 to determine their proximity to one another. For example, in an embodiment, the wireless signal based location security system in an embodiment may triangulate the position of mobile information handling system 450 with respect to one or more of APs 410, 420, 430, or 440 based on TOF for a wireless link 412 with AP 410, wireless link 422 with AP 420, wireless link 432 with AP 430, or wireless link 442 with AP 440 and assess detected RSSI values of these wireless links 412, 422, 432, and 442. As another example, the wireless signal based location security system in an embodiment may triangulate the position of mobile information handling system 460 with respect to one or more of APs 410, 420, 430, or 440 based on TOF for a wireless link 414 with AP 410, wireless link 424 with AP 420, wireless link 434 with AP 430, or wireless link 444 with AP 440 and assess detected RSSI values of these wireless links 414, 424, 434, and 444. The assessed RSSI values in an embodiment for each of the wireless links established (e.g., 412, 414, 422, 424, 432, 434, 442, and 444) may be compared against the TOF for each of these wireless links to determine physical boundaries of a room or office the information handling system 450 is in. By combining such triangulated position information for the mobile information handling systems 450 and 460 in an embodiment, the wireless signal based location security system may determine a location fingerprint for each of mobile information handling systems 450 and 460, describing each of their positions with reference to the security perimeter 400 and one or more objects (e.g., walls, doors, desks, etc) within the security perimeter 400.

Comparison of the location fingerprints for mobile information handling systems 450 and 460 in an embodiment may indicate the proximity of mobile information handling systems 450 and 460 with respect to one another, as well as the existence of physical boundaries (e.g., walls, doors) between mobile information handling systems 450 and 460. The wireless signal based location security system in an embodiment may perform such a comparison to determine whether the mobile information handling systems 450 and 460 are located within close proximity to one another, or if mobile information handling system 450 may be visible to a user of mobile information handling system 460 (e.g., no physical boundaries detected between the two). In such a scenario, the wireless signal based location security system operating at one or more of the APs 410, 420, 430, or 440 may revoke the mobile information handling system 450 access to the secured network, or to highly-secured portions of the secured network to which APs 410, 420, 430, or 440 are connected depending on which room the information handling system 450 is in or depending on proximity to the other information handling system 460. Further, the wireless signal based location security system operating a the mobile information handling system 450 or at the APs 410, 420, 430, or 440 in such a scenario may perform a emergency shut down of the operating system of mobile information handling system 450, such that sensitive data accessible by the operating system at mobile information handling system 450 may not be viewed by the user of mobile information handling system 460. In such a way, the wireless signal based locations security system operating at the mobile information handling system or the AP may deny a mobile information handling system access to secure networks or begin a remote forced shut down if other non-secure information handling systems are located nearby.

In another embodiment, the wireless signal based location security system operating at one or more of the APs 410, 420, 430, or 440 in an embodiment may routinely monitor and update the architectural layout to determine if the secured perimeter 400 or a subset thereof has been breached or changed or if changes have occurred at locations of APs or physical barriers. For example, RSSI and TOF values for one or more mobile information handling systems in an embodiment may be gathered continuously over time and analyzed routinely to reconfigure the placement of one or more physical objects (e.g., doors) within the secured perimeter 400 and with respect to secured, address-identified APs. In such a way, the architectural layout may indicate a current position of a moveable object, such as a door. Further, one or more doors may be designated as critical to maintenance of the security perimeter 400 in an embodiment. For example, a door between the reception area, lying outside the security perimeter 400, and the interior of the office, lying within the security perimeter 400 may be designated within the architectural layout as critical to maintenance of the secured perimeter 400.

Movement of such a door in an embodiment, as detected by the wireless signal based location security system, may prompt a warning that the security perimeter 400 has been breached. Upon a determination such a breach of the security perimeter 400 has occurred in an embodiment, the wireless signal based location security system operating at the mobile information handling system 450 or 460 or at one or more of the APs 410, 420, 430, or 400 may deny mobile information handling systems 450 or 460 access to the network to which APs 410, 420, 430, and 440 are connected, or may begin forced shut down of one or more of mobile information handling systems 450 or 460. In such a way, the wireless signal based locations security system may deny a mobile information handling system access to secure networks or begin a remote forced shut down if the security perimeter is not fully secured, such as a door to a room or the secured perimeter is not shut, or is open.

Figure 5:
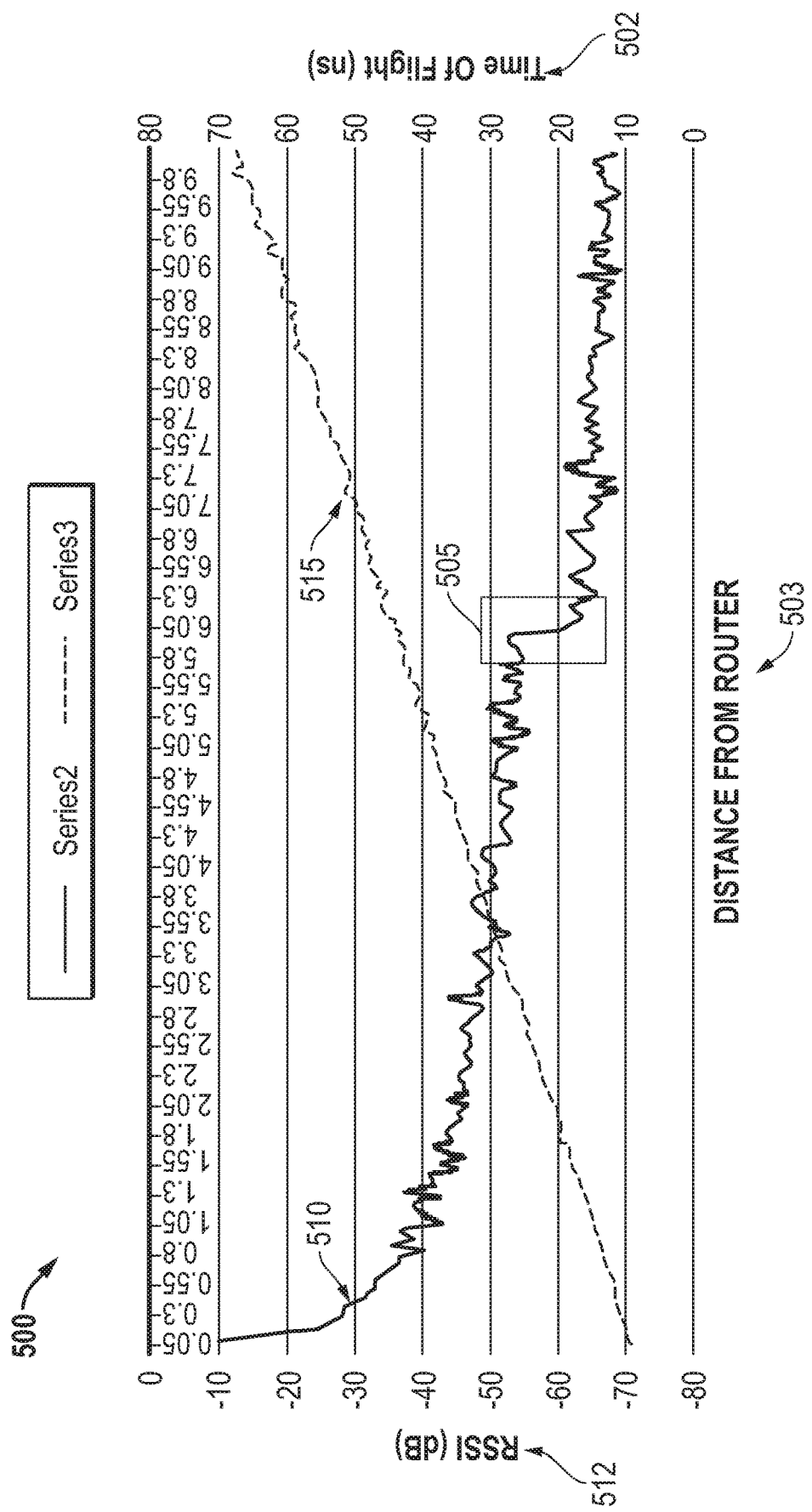
FIG. 5 is a flow diagram illustrating a method of denying a mobile information handling system located outside a secured perimeter access to a secured network according to an embodiment of the present disclosure.

FIG. 5 is a graph 500 showing value of RSSI 510 versus a TOF 515 according to an embodiment of the present disclosure. The graph 500 shows a RSSI 510 representative of a signal sent or received by either of the access points or information handling systems over time. As FIG. 5 shows, the RSSI signal strength 512 (measured in decibels (dB)) degrades over time/distance 502/503 and this degradation may be predictable based on the distance of, for example, the information handling system from any one of the access points.

FIG. 5 also shows a TOF line 515 indicative of the time 502 a signal reaches its destination over a distance 503. By way of example, a signal from an access point may be sent to an information handling system along with a timestamp. The time stamp may be accurate enough to provide a TOF value on the order of nanoseconds (ns). Thus, in this example, the access point may provide not only a signal to the information handling system but also provide a timestamp the signal was sent so that the information handling system may compare the timestamp received from the access point with a timestamp the information handling system received the signal. Again, the accuracy of this comparison may be dependent on the precision of the network interface device of the information handling system but may be sufficient to determine the time 502 the signal took to traverse the distance 503 from the access point to the information handling system on the scale of nanoseconds.

FIG. 5 also shows a highlighted area 505 along the RSSI line 510. This specific highlighted area 505 shows a reduction in power (dB) of the RSSI value at a distance from the access point. In this example, this reduction is detected at 5.8 to 6.3 meters from the source of the signal (i.e., an access point). This reduction in power at 505, per FIG. 5, is around 52 to 65 dB. As compared to the rest of the RSSI line 510, this reduction may indicate an object is present between the source of the signal (i.e., the access point) and the destination of the signal (i.e., the information handling system).

Figure 6:
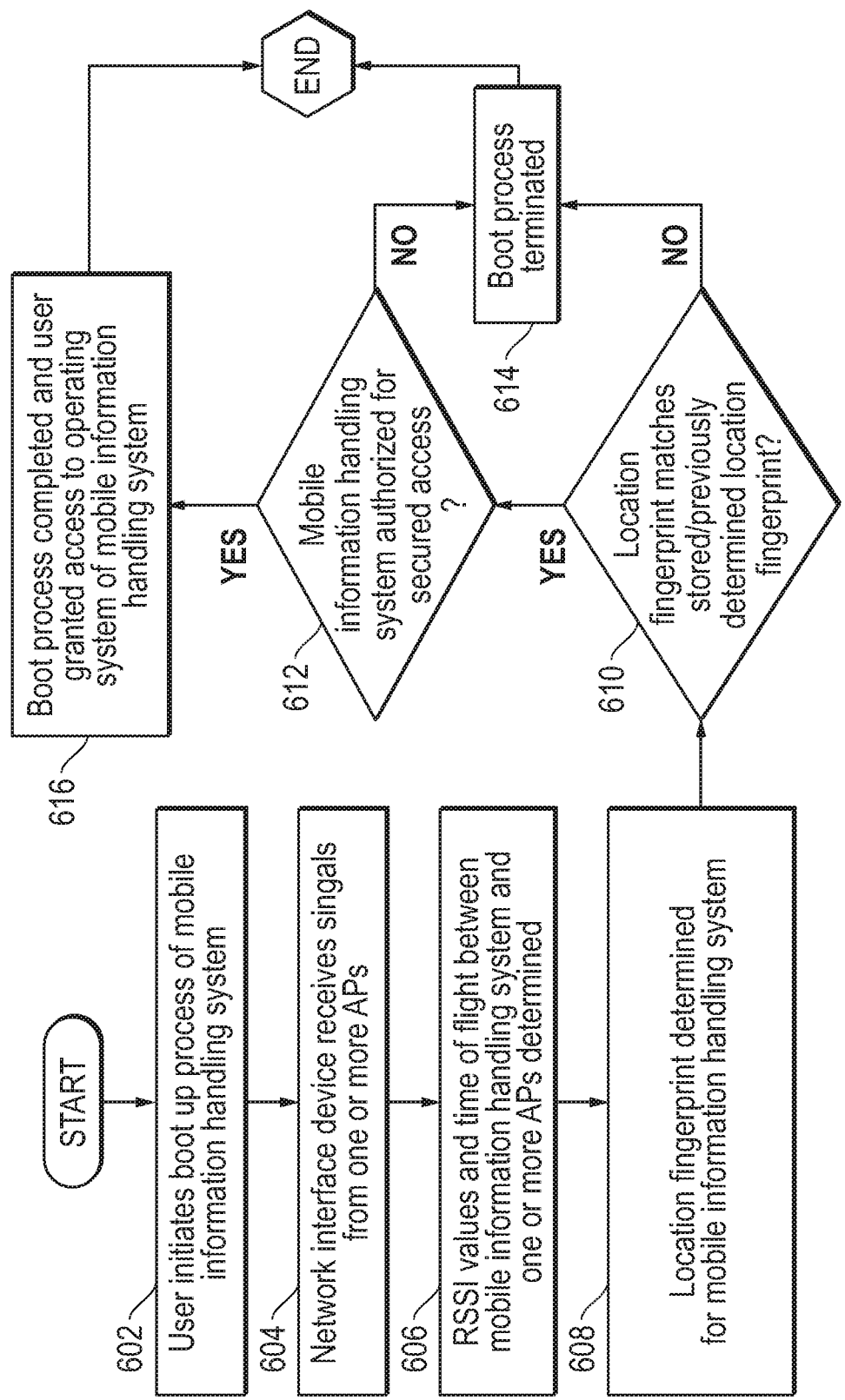
FIG. 6 is a flow diagram illustrating a method of denying a mobile information handling system access to a secured network upon occurrence of a security threat according to an embodiment of the present disclosure.

FIG. 6 is a flow diagram illustrating a method of denying a mobile information handling system located outside a secured perimeter access to a secured network or inhibiting the boot process of such an information handling system according to an embodiment of the present disclosure. As described herein, the wireless signal based location security system in an embodiment may secure network access in such a way based, in part, on a geofencing method. Geo fencing methods may be achieved through various means in existing systems, including through Global Positioning Satellite (GPS) data, and identification with near-field communication (NFC). GPS data works best in outdoor environments with exceptional line-of-sight, and is ill-suited for use indoors. Further, NFC methods require extensive installation and maintenance and incorporation of extra components within a mobile information handling system to allow it to perform near-field communications with one or more closely situated access points. The wireless signal based location security system in an embodiment may overcome these drawbacks by determining the location of a mobile information handling system with respect to a secure perimeter based on a method of triangulation and RSSI detection from a plurality of secured, address-identified APs within a secure facility.

At block 602, a boot up process for a mobile information handling system may be initiated in an embodiment. The mobile information handling system in an embodiment may operate a portion of the wireless signal based location security system during the boot up process, prior to the user gaining access to the operating system of the mobile information handling system. The mobile information handling system in such an embodiment may be located within or outside a secure perimeter in which the mobile information handling system is authorized to access a secure network or access sensitive information stored on the mobile information handling system itself. For example, in an embodiment described with reference to FIG. 2, a boot up process may be initiated for the mobile information handling system 250, which may be located within the secure perimeter 200. As another example, in an embodiment described with reference to FIG. 4, a boot up process may be initiated for the mobile information handling system 450 or the mobile information handling system 460, both of which may be located within the secure perimeter 400.

The mobile information handling system may operate the portion of the wireless signal based location security system in an embodiment via preboot authentication code instructions within the firmware, or within the Basic Input Output (BIOS) of the mobile information handling system. The code instructions of the wireless signal based location security system in an embodiment may be executed entirely prior to handing off of processor functionality from the BIOS to the operating system of the mobile information handling system. The boot up process may be initiated and handed off to the wireless signal based location security system at block 602.

The network interface device of the mobile information handling system in an embodiment may receive wireless signals from one or more in-range access points (APs) at block 604. For example, the mobile client information handling system in an embodiment may receive a broadcast message from one or more APs. These broadcast messages may be received in an embodiment prior to an exchange between the mobile information handling system and the AP of a series of Extensible Authentication Protocol (EAP) messages with the Access Point (AP) as part of a Wi-Fi Protected Setup (WPS) security method.

At block 606, the RSSI values and time of flight (TOF) for communications between the mobile information handling system and two or more APs may be determined. For example, the time of flight for the transmission of the EAP message from the mobile information handling system to two or more APs, and the APs responsive message granting preliminary access may be determined by analyzing header and footer information of the message packets, or timestamps associated with such messages. The time of flight (TOF) in an embodiment may identify the time that elapses between transmission of a wireless communication from the mobile information handling system to an AP, or vice-versa. For example, a first TOF in an embodiment described with reference to FIG. 2 may identify a first time that elapses between transmission of communication from mobile information handling system 250 to AP 210. In such an embodiment, a second TOF may identify a second time that elapses between transmission of communication from mobile information handling system 250 to AP 240. Comparison of these TOF measurements may indicate locations of the mobile information handling system 250 relative to both the AP 210 and the AP 240.

The location fingerprint system operating at the mobile information handling system may also measure RSSI values for the wireless links established between the mobile information handling system and the one or more APs in an embodiment. For example, in an embodiment described with reference to FIG. 1, the location fingerprint system 136 may measure a power present in a received wireless signal such as a signal received by the information handling system 100 from a plurality of access points 138-1, 138-2, 138-N. The location fingerprint system 136 may be in the form of an application specific integrated circuit (ASIC) that receives signal strength data (e.g., RSSI values) from the network interface device 120. The location fingerprint system 136 may compare the RSSI data to the time of flight (TOF) data to detect a reduction in power of the signal strength (resulting from the signal passing through a structure) relative to the time the signal took to be received by either or both of the information handling system 100 or network interface device 120. The reduction in RSSI relative to the TOF data may indicate an barrier or object such as a wall is present between any of the access points 138-1, 138-2, 138-N and any information handling system 100 within the network operating the systems and methods described herein.

At block 608, the location fingerprint system operating at the mobile information handling system in an embodiment may determine a current location fingerprint for the mobile information handling system. A location fingerprint in an embodiment may comprise a single record for each of a plurality of APs with which the mobile information handling system has established a wireless link. Each of these records in an embodiment may include the MAC address of one of the plurality of in-range, address-identified APs, the TOF for the wireless link established with the AP having that MAC address, and the measured RSSI values for that wireless link. Thus, the location fingerprint for the mobile information handling system may describe not only the relative position (as represented by TOF measurements) of the mobile information handling system with respect to a plurality of APs, but may also indirectly indicate the presence of physical boundaries (e.g., as indicated by drops in RSSI values) located between the mobile information handling system and each of the plurality of APs. As described herein, this added descriptor of RSSI value within a location fingerprint may inhibit easy circumvention or "spoofing" of triangulated locations within the secured perimeter. The wireless location fingerprint may thus indicate the mobile information handling system is at a relative location with respect to secured APs in a security perimeter of a facility.

The location fingerprint system operating at one or more APs in an embodiment may determine at block 610 whether the current location fingerprint for the mobile information handling system matches any previously determined location fingerprints. Location fingerprints for a plurality of mobile information handling systems determined over time may be stored at the one or more APs in an embodiment, or at a remote storage module accessible by one or more of the APs with which the mobile information handling system has established a wireless link. Stored location fingerprints in an embodiment may include previously measured RSSI and TOF values for information handling systems known to be located within the preset, secured perimeter. As such, the location fingerprint determined at block 610 may only match or be clustered with existing location fingerprints if the mobile information handling system associated with the location fingerprint is also located within the preset, secured perimeter. In some embodiments, the stored location fingerprints may be seeded by an information technology (IT) specialist to include RSSI/TOF/MAC address combinations measured by an information handling system as the IT specialist moves about an area the IT specialist wishes to define as secured. In other embodiments, the stored location fingerprints may include only location fingerprints associated with mobile information handling systems that have successfully initiated secured wireless communication links with one or more of the secure, address-identified APs through an EAP handshake or other cryptographic security method. Through clustering and machine learning techniques, the wireless signal based location security system may utilize learned location fingerprints to determine locations and an architectural layout of one or more secured perimeters, such as rooms or areas of a secured facility, relative to a plurality of secure, address-identified APs deployed within the facility.

Because the current location fingerprint includes both TOF and RSSI measurements, it may only match or be clustered with previously recorded location fingerprints taken by an information handling system having the same physical location with respect to the one or more secure, address-identified APs with which the mobile information handling system has established wireless links, and with respect to one or more physical boundaries surrounding the APs and the mobile information handling system. In other words, the location fingerprint will only match or be clustered with previous location fingerprints having similar TOF and RSSI values associated with a given address-identified AP. This match of TOF and RSSI need not be exact due to variations in an area and potential changes to barriers or locations of users or radios. However, a range of TOF and RSSI values relative to address identified APs may be learned for locations clustered in an area and determined to be a room or within a security perimeter. Further, the categorization engine may also be flexible enough to identify location fingerprints even if changes occur, such as to a location of an AP, to provide for machine learning of adjustments to the location fingerprints. With such a system, security for an indoor facility with one or more secured perimeters defined relative to a plurality of secured, address identified APs may be enhanced. For example, a "spoofed" location fingerprint may provide accurate TOF measurements to describe the relative position of the mobile information handling system with respect to the one or more APs, but it cannot provide accurate RSSI measurements unless it is actively located within the same physical and architectural layout that describes the area within the secured perimeter. If the location fingerprint does not match any previous location fingerprints, this may indicate a spoofing attempt or an attempt to access the network from outside the secured perimeter, and the method may proceed to block 614 for termination of the boot process. If the location fingerprint matches previous location fingerprints, the method may proceed to block 612.

The wireless signal based location security system in an embodiment may determine at block 612 whether the mobile information handling system is authorized to access the secure network with which the APs are in communication. Authorization of the mobile information handling system in an embodiment may be established based on EAP authorization, positive identification of the user of the mobile information handling system, or other known security methods. For example, a user may positively identify herself as an authorized user of the secure network and the mobile information handling system in an embodiment through a username and password, scanning a key fob or other peripheral device, or any number of biometric scanning methods, such as, for example, iris scanning, fingerprint scanning, voice recognition, or face recognition. Other security methods may include asymmetric encryption or other encryption handshake techniques, for example. If the wireless signal based location security system determines the user is not authorized to access the secure network, the method may proceed to block 614 to terminate the boot process. If the wireless signal based location security system determines the user is authorized to access the secure network, the method may proceed to block 616.

At block 614, in an embodiment in which the mobile information handling system location fingerprint does not match any previously determined location fingerprints for clustering in a room or location that is within a secure perimeter, the wireless signal based location security system determines the mobile information handling system is not located within the secured area, or that the mobile information handling system is not authorized for secure access, the portion of the wireless signal based location security system operating at the mobile information handling system may abort the boot process for the mobile information handling system. For example, a portion of the wireless signal based location security system may operate onboard the mobile information handling system 350 in an embodiment described with reference to FIG. 3. In such an example embodiment, the BIOS may have handed the boot process off to the wireless signal based location security system in firmware of the mobile information handling system 350 at block 602. Upon determination the mobile information handling system 350 is not located within the secured perimeter 300 in such an embodiment, the portion of the wireless signal based location security system operating at one or more of the APs 310, 320, 330, or 340 may transmit an instruction to the portion of the wireless signal based location security system operating within the firmware of mobile information handling system 350 to abort the boot process. The portion of the wireless signal based location security system operating on the firmware of the mobile information handling system 350 in such an embodiment may stall the boot up process until a preset timer elapses, causing the boot up process to reinitiate from the beginning. The method may then end. In such a way, the location multi-factor verification system operating at the mobile information handling system and the access point of a secured network may prohibit a user of the mobile information handling system operating outside of the preset geographical area from accessing the operating system of the mobile information handling system, or the secure network.

The wireless signal based location security system in an embodiment may complete the boot process for the mobile information handling system, granting the user access to the operating system at block 616. For example, in an embodiment described with reference to FIG. 2, the wireless signal based location security system operating at one or more of APs 210, 220, 230, or 240 may transmit an instruction to complete the boot up process to the portion of the wireless signal based location security system operating in firmware of the mobile information handling system 250. Such an instruction in an embodiment may only be transmitted upon determination the mobile information handling system 250 is located within the secured perimeter 200, and that the mobile information handling system 250 and its current user are authorized to access the secure network to which APs 210, 220, 230, and 240 belong. Upon receipt of such an instruction at the firmware of the mobile information handling system 250 in an embodiment, the portion of the wireless signal based location security system operating thereon may hand the boot up process back to the BIOS of the mobile information handling system 250 to complete the boot up process.

The mobile information handling system may also initiate a series of Extensible Authentication Protocol (EAP) messages with the AP as part of a Wi-Fi Protected Setup (WPS) security method, in order to gain access to the secure network with which the AP is in communication at block 616. The AP in an embodiment may only grant access to mobile information handling systems that provide proper authorization, and have been previously determined to be located within the secured perimeter. For example, the mobile information handling system may transmit a password to the AP, taken from a sticker mounted on the external physical case of the AP. In another example, a user of the mobile information handling system may place the mobile information handling system and the AP in simultaneous discovery modes to identify one another by pressing a physical button on both the AP and the mobile information handling system contemporaneously. In yet another example, the mobile information handling system may establish a near-field communication link with the AP to identify itself as being located nearby the AP.

In an example embodiment described with reference to FIG. 2, the mobile information handling system 250 may perform such a method to establish wireless link 212 with AP 210, wireless link 222 with AP 220, wireless link 232 with AP 230, or wireless link 242 with AP 240. In another example embodiment described with reference to FIG. 3, the mobile information handling system 350 may perform such a method to establish wireless link 312 with AP 310, wireless link 322 with AP 320, wireless link 332 with AP 330, or wireless link 342 with AP 340. In yet another example embodiment described with reference to FIG. 4, the mobile information handling system 450 may perform such a method to establish wireless link 412 with AP 410, wireless link 422 with AP 420, wireless link 432 with AP 430, or wireless link 442 with AP 440. In still another example embodiment described with reference to FIG. 4, the mobile information handling system 460 may perform such a method to establish wireless link 414 with AP 410, wireless link 424 with AP 420, wireless link 434 with AP 430, or wireless link 444 with AP 440. The method may then end. In such a way, the wireless signal based location security system in an embodiment may grant access to the mobile information handling system operating system or the secure network only to mobile information handling systems determined to be located within the secured perimeter using wireless fingerprint methods, including TOF and RSSI values.

Figure 7:
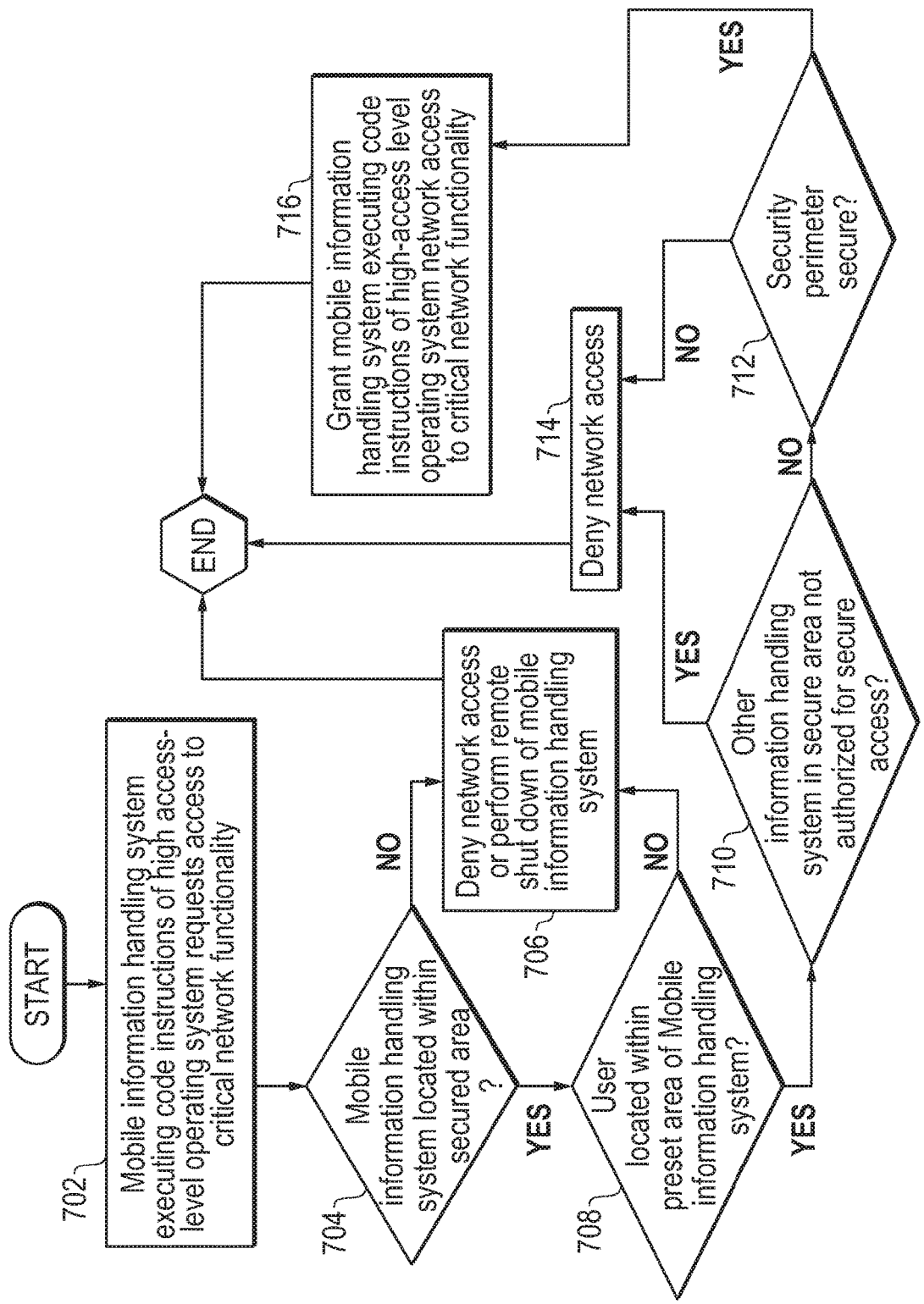
FIG. 7 is a flow diagram illustrating a method of managing a mobile information handling system access to a secured network or forcing shut down of such a mobile information handling system upon occurrence of a security threat according to an embodiment of the present disclosure.

FIG. 7 is a flow diagram illustrating a method of denying a mobile information handling system access to a secured network or forcing shut down of such a mobile information handling system upon occurrence of a security threat according to an embodiment of the present disclosure. As described herein, the wireless signal based locations security system operating at the mobile information handling system or the AP may deny access to secure networks unless the mobile information handling system is being operated by an authorized user, within the secured area, the security perimeter is fully secured, and no other non-secure information handling systems are located nearby. The wireless signal based location security system in an embodiment may further withdraw access to a secure network or perform a remote shut down of a mobile information handling system if a breach of the security perimeter occurs, a lower-level security device enters the secured area, or the authorized user of the mobile information handling system moves away from the mobile information handling system. Determinations underlying the methods of each of these embodiments may be made based on the location fingerprint system described herein to detect locations of an information handling system and a relative layout of secure perimeters and rooms for a plurality of address identified APs in the secured area. As such, embodiments herein may not require the use of GPS methods, or NFC methods.

At block 702, the fully-booted mobile information handling system may request access to critical network functionality or continue operating locally and with multiple in-range APs. In one example embodiment, the information handling system may only continue operations if in wireless contact with a secured AP and having allocation fingerprint in a secured area. For example, in another embodiment described with reference to FIG. 4, the mobile information handling system 450 may request access to the secured network with which APs 410, 420, 430 or 400 are in communication. In another aspect, the mobile information handling system 450 in such an embodiment may access a portion of such a secure network protected by heightened security requirements. The mobile information handling system 450 in such an embodiment may provide a username/password, a keyfob, or a biometric form of identification, for example, in order to gain access to high-level secure information.

The wireless signal based location security system operating at one or more APs in an embodiment may determine at block 704 whether the mobile information handling system is located within the security perimeter. For example, in an embodiment described with reference to FIG. 3, the wireless signal based location security system operating at the one or more APs 310, 320, 330, or 340 may determine the mobile information handling system 350 is located outside the secured perimeter 300. As another example, in an embodiment described with reference to FIG. 4, one or more APs 410, 420, 430, or 440 in an embodiment may determine the mobile information handling system 450 that is requesting access to the high-level secure information is physically located within the secured perimeter 400. The one or more APs operating the wireless signal based location security system in such an embodiment may make such a determination based, at least in part, on the location fingerprint developed for the mobile information handling system requesting access, as described herein. If the mobile information handling system requesting access is located within the preset secured perimeter, the method may proceed to block 708. If the mobile information handling system requesting access is not located within the preset secured perimeter, the method may proceed to block 706 where access may be denied or the information handling system may shut down and access to it be denied.

At block 706, in an embodiment in which the mobile information handling system requesting access is not located within the preset secured perimeter, the wireless signal based location security system may deny network access to the high-level secured information. For example, in an embodiment described with respect to FIG. 3, the wireless signal based location security system operating at APs 310, 320, 330 or 340 may deny the mobile information handling system 350 access to the secure network to which APs 310, 320, 330, or 340 are connected, or any sub-part thereof, upon determining the mobile information handling system 350 is located outside the secure perimeter 300. In another aspect, upon such a determination, the wireless signal based location security system operating at the one or more APs 310, 320, 330, or 340 may perform a remote shut down of the mobile information handling system 350 in such an embodiment. In yet another embodiment, the wireless signal based location security system operating at the mobile information handling system 350 may black out the digital display or lock out the user until the mobile information handling system 350 returns to the secured area. In still another embodiment, the wireless signal based location security system operating at the mobile information handling system 350 may initiate a data or hardware self-destruction or purge protocol. In such a way, the wireless signal based location security system in an embodiment may secure sensitive information persisted at the secure network accessed via the one or more APS, or persisted at the operating system of the mobile information handling system, upon movement of the mobile information handling system outside the preset, geofenced, secured perimeter. The method may then end.

In one optional embodiment in which the mobile information handling system requesting access is located within the preset secured perimeter, the wireless signal based location security system operating at the mobile information handling system may determine whether the user of the mobile information handling system is located within a preset area of the mobile information handling system at block 708. The wireless signal based location security system in an embodiment may protect sensitive information persisted at the mobile information handling system by ensuring sensitive information is not displayed thereon or otherwise made accessible in the absence of the authorized user for that system. The user may be present within a preset perimeter surrounding the mobile information handling system in an embodiment to be considered "nearby," or "not absent." Such a preset perimeter in some embodiments may be measured in distance alone (e.g., one meter, ten meters). In other embodiments, such a preset perimeter may also depend upon the identification of solid objects (e.g., wall, door) located between the user and the mobile information handling system, based on analysis of the location fingerprint for the mobile information handling system and an estimated location of the user.

For example, in an embodiment described with reference to FIG. 4, the wireless signal based location security system operating at the mobile information handling system 450 may determine whether the authorized user of the mobile information handling system 450 is still located nearby the mobile information handling system 450. Such a determination may be made by monitoring execution of applications and input commands received from any one of various user input devices to determine current user interaction with the mobile information handling system 450. In other embodiments, such a determination may be made by analysis of ambient noise surrounding the mobile information handling system 450, as recorded by a microphone incorporated therein, or analysis of other biometric sensors, including cameras, face-recognition software, iris scanners, or fingerprint scanners, for example. Such biometric authentication may be prompted if a delay in activity is detected in some embodiments. If the wireless signal based location security system determines the user is not within the preset area, sensitive information persisted at the mobile information handling system may need to be protected, and the method may proceed to block 706 for denial of network access, and potentially, additional remote shut down of the mobile information handling system. If the wireless signal based location security system determines the user is within the preset area, the method may proceed to block 710.

At block 710, the wireless signal based location security system in an embodiment may determine whether other information handling systems not authorized for access to the secure network or sensitive information are located within the secure perimeter. For example, the wireless signal based location security system operating at one or more of the APs 410, 420, 430, or 440 in an embodiment may determine the information handling system 260 is located within the secure perimeter 400 using the same or similar method of location fingerprinting used to determine information handling system 250 is also located within the secure perimeter 400. Mobile information handling system 260 in an embodiment may not be authorized to access the secure network with which the APs 410, 420, 430, or 440 are connected, or to access sensitive information stored within the secure network or at the mobile information handling system 250, for example. As such, the existence of the mobile information handling system 260 within the secure perimeter 400 may indicate a potential breach in security. If the wireless signal based location security system determines an unauthorized or less secure mobile information handling system is located within the secure perimeter, the method may proceed to block 714 to address the potential security risk associated therewith. If the wireless signal based location security system determines an unauthorized or less secure mobile information handling system is not located within the secure perimeter, the method may proceed to block 712.

The wireless signal based location security system operating at one or more of the APs in an embodiment in which any mobile information handling systems located within the secure perimeter are authorized to access the secure network may determine whether the security perimeter has been breached at block 712. A breach in the security perimeter 400 in an example embodiment may indicate another potential for a security breach to data or unauthorized use of a secure information handling system. For example, the wireless signal based location security system operating at one or more of the APs 410, 420, 430, or 440 in an embodiment may routinely monitor and update the architectural layout, as determined by the mapped location fingerprint information relative to those address-identified APs, to determine if the secured perimeter 400 or a subset thereof has been breached. The architectural layout may indicate a current position of a moveable object, such as a door designated as critical to maintenance of the security perimeter 400 in an embodiment. For example, a door between the reception area, lying outside the security perimeter 400, and the interior of the office, lying within the security perimeter 400 may be designated within the architectural layout as critical to maintenance of the secured perimeter 400. Movement of such a door in an embodiment, as detected by the wireless signal based location security system, may prompt a warning that the security perimeter 400 has been breached. That movement may be detected by smart sensors transmitting at the doors or by changes in RSSI values among location fingerprints. For example, the address-identified APs, or other radios may be used to sense changes in physical barriers of the secure perimeter or architectural layout as identified via location fingerprints with radios in or outside the secured perimeter.

At block 714, the wireless signal based location security system operating at one or more of the APs in an embodiment in which a potential security breach has been identified may deny network access to all mobile information handling systems within the secure perimeter. Such a security breach may be detected, for example, if one or more of the mobile information handling systems within the secure perimeter does not have authorization to access the secure network, or if the security perimeter itself has been breached. For example, the secure perimeter 400 may be breached if a door separating the reception area located outside the perimeter 400 and the interior office located within the perimeter 400 is opened. As another example, the mobile information handling systems 450 and 460 in an embodiment may be located within the secure perimeter 400, and mobile information handling system 450 has authorization to access the secure network with which the APs 410, 420, 430, or 440 are in communication. However, the mobile information handling system 460 in such an embodiment may not have sufficient security clearance to access the secure network, presenting a potential security breach. The wireless signal based location security system may address such a potential security breach by denying access to the secure network to all mobile information handling systems within the secure perimeter 400. For example, the wireless signal based location security system operating at one or more of APs 410, 420, 430, or 440 in such an embodiment may deny access to both mobile information handling systems 250 and 260, despite the fact that mobile information handling system 250 has authorization or credentials to access the secure network. The method may then end. In such a way, the wireless signal based location security system in an embodiment may avoid potential security breaches.

In an embodiment in which no potential security breaches have been detected, and in which both the mobile information handling system and its user are located within the secure perimeter, the wireless signal based location security system may grant the mobile information handling system executing code instructions of the high-access level operating system network access to critical network functionality at block 716. For example, in an embodiment described with reference to FIG. 2, the mobile information handling system 250 having credentials sufficient to access critical network functionality may be located inside the security perimeter 200, and no other mobile information handling systems having lower security credentials may be within the perimeter 200. In such an example, the user of mobile information handling system 250 may be determined to be in close proximity to the mobile information handling system 250. Further, if no potential other security breaches are identified (e.g., breach in the security perimeter 200), the wireless signal based location security system operating at one or more of the APs 210, 220, 230, or 240 may grant the mobile information handling system 250 access to critical network functionality within the secure network with which APs 210, 220, 230, or 240 are in communication. The method may then end. In such a way, embodiments of the present disclosure may provide a security method, based on indoor geofencing, that decreases maintenance and installation requirements, and does not require extra components.

The blocks of the flow diagrams of FIG. 6-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of controlling access of an information handling system to a secured network, comprising:

initiating a boot process of the information handling system via firmware of the information handling system;

detecting a time of flight (TOF) signal distance between the information handling system and a plurality of address-identified wireless local area network (WLAN) access points and RSSI values with the plurality of address-identified WLAN access points;

determining, via a processor executing code instructions of the information handling system, a location fingerprint of the information handling system relative to the plurality of address-identified WLAN access points based on the TOF and RSSI values;

completing the boot process of the information handling system, if the location fingerprint matches a previously determined location fingerprint and indicates the information handling system is located within a preset secured perimeter relative to those address-identified WLAN access points; and establishing a wireless link to a secured network via one of the plurality of WLAN access points.

2. The method of claim 1 further comprising:
terminating the boot process of the information handling system, if the location fingerprint is determined outside the preset secured perimeter.

3. The method of claim 1 further comprising:
determining a second location fingerprint indicating that the information handling system has moved and is located outside the preset secured perimeter; and
performing an emergency shut down of an operating system of the information handling system.

4. The method of claim 1 further comprising:
determining a second location fingerprint indicating, via a sensor, that a user of the information handling system is situated outside a preset radius of the information handling system; and
performing an emergency shut down of an operating system of the information handling system.

5. The method of claim 4, wherein the sensor is a biometric sensor.

6. The method of claim 1 further comprising:
receiving an indication that an unauthorized information handling system is located within a preset secured perimeter of the information handling system, via one of the plurality of WLAN access points; and
terminating the wireless link to the secure network.

7. The method of claim 1 further comprising:
determining a second location fingerprint indicating that the information handling system has moved and is located outside the preset secured perimeter; and
terminating the wireless link to the secured network.

8. An information handling system operating a wireless signal based location security system, comprising:
firmware of the information handling system initiating a boot process of the information handling system;
a processor executing instructions of a location fingerprint system detecting time of flight (TOF) signal distance between the information handling system and a plurality of address-identified wireless local area network (WLAN) access points and received signal strength indication (RSSI) values with the plurality of address-identified WLAN access points to determine a location fingerprint;
the processor determining a secured perimeter via the location fingerprint system relative to the plurality of address-identified WLAN access points; and
the firmware completing the boot process of the information handling system, if the location fingerprint is within a range of a previously determined location fingerprint indicating the information handling system is located within the secured perimeter, and establish a wireless link to a secure network via one of the plurality WLAN access points.

9. The information handling system of claim 8 further comprising:
the firmware terminating the boot process of the information handling system, if the location fingerprint indicates the information handling system is located outside the preset secured perimeter.

10. The information handling system of claim 8 further comprising:
the processor determining that the information handling system has moved and via a second location fingerprint is located outside the secured perimeter; and
the processor performing an emergency shut down of an operating system of the information handling system.

11. The information handling system of claim 8 further comprising:
a network interface device establishing the wireless link to the secured network via one of the plurality of WLAN access points upon determination that the information handling system location fingerprint is located within the secured perimeter.

12. The information handling system of claim 11 further comprising:
the processor determining that the information handling system has moved and via a second location fingerprint is located outside the secured perimeter but within a second secured perimeter; and
the processor limiting access to a portion of the secured network.

13. The information handling system of claim 8 further comprising:
the network interface device receiving an indication that an unauthorized information handling system is located within the preset secured perimeter, via one of the plurality of WLAN access points; and
the network interface terminating the wireless link to the secure network.

14. The information handling system of claim 8 further comprising:
the processor determining that the secured perimeter has been breached via a second location fingerprint indicating the secured perimeter has changed; and
the processor performing an emergency shut down of an operating system of the information handling system; and door open
the network interface terminating the wireless link to the secure network.

15. A method of operating one of a plurality of address-identified wireless local area network (WLAN) access points controlling access of an information handling system to a secured network, comprising:
receiving a request from a first information handling system to establish a wireless link to a secured network via one of the plurality of address-identified WLAN access points;
detecting a time of flight (TOF) signal distance between the first information handling system and the plurality of address-identified WLAN access points;
detecting a received signal strength indication (RSSI) value for the plurality of address-identified WLAN access points;
determining, via a processor executing code instructions of the one of the address-identified plurality of WLAN access points, a location fingerprint of the first information handling system relative to the plurality address-identified WLAN access points that are within a range of a previously determined location fingerprint and places the first information handling system within a secured perimeter relative to the plurality address-identified WLAN access points; and granting the first information handling system access to the secured network via one of the plurality of address-identified WLAN access points.

16. The method of claim 15 further comprising:

determining via the location fingerprint that the information handling system is located outside the secured perimeter; and denying the first information handling system access to the secured network.

17. The method of claim 15 further comprising:

determining via the location fingerprint that the information handling system is located outside the secured perimeter; and transmitting an instruction to the first information handling system to perform an emergency shutdown of an operating system of the first information handling system.

18. The method of claim 15 further comprising:

determining via a second location fingerprint that the information handling system has moved outside the secured perimeter; and terminating the first information handling system access to the secured network.

19. The method of claim 15 further comprising:

determining via a second location fingerprint that the information handling system has moved outside the secured perimeter; and transmitting an instruction to the first information handling system to perform an emergency shutdown of an operating system of the first information handling system.

20. The method of claim 15 further comprising:

determining that a second information handling system that is unauthorized to access the secure network is located within the preset secured perimeter; and denying the first information handling system access to the secured network.

* * * * *